(12) United States Patent
Ziegler (10) Patent No.: US 8,539,113 B2
(45) Date of Patent: Sep. 17, 2013

(54) INDICATORS FOR STREAMS ASSOCIATED WITH MESSAGES

(75) Inventor: Michael L. Ziegler, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/161,894

(22) Filed: Jun. 16, 2011

(65) Prior Publication Data
US 2012/0320910 A1  Dec. 20, 2012

(51) Int. Cl.
*G06F 3/00* (2006.01)
*G06F 13/28* (2006.01)

(52) U.S. Cl.
USPC ......... 710/5; 710/12; 710/20; 710/21; 710/26

(58) Field of Classification Search
USPC .................................. 710/5, 12, 20, 21, 26
See application file for complete search history.

(56) References Cited

U.S. PATENT DOCUMENTS

| | | | | |
|---|---|---|---|---|
| 6,467,032 | B1 * | 10/2002 | Lippert | 711/150 |
| 6,907,248 | B2 * | 6/2005 | Lee et al. | 455/450 |
| 6,952,766 | B2 * | 10/2005 | Dervin et al. | 713/2 |
| 7,701,905 | B2 | 4/2010 | Farley et al. | |
| 7,702,726 | B1 * | 4/2010 | Grabelsky et al. | 709/204 |
| 8,060,728 | B2 * | 11/2011 | Gonion et al. | 712/225 |
| 8,078,847 | B2 * | 12/2011 | Gonion et al. | 712/225 |
| 2002/0133727 | A1 * | 9/2002 | Dervin et al. | 713/310 |
| 2002/0161836 | A1 * | 10/2002 | Hosomi | 709/203 |
| 2004/0210688 | A1 * | 10/2004 | Becker | 710/58 |
| 2006/0117114 | A1 * | 6/2006 | Verma et al. | 710/5 |
| 2008/0071944 | A1 * | 3/2008 | James et al. | 710/30 |
| 2008/0195912 | A1 | 8/2008 | Mende et al. | |
| 2009/0319604 | A1 * | 12/2009 | Hatasaki et al. | 709/203 |
| 2009/0319701 | A1 * | 12/2009 | Mehrotra | 710/29 |

FOREIGN PATENT DOCUMENTS

| | | |
|---|---|---|
| EP | 0993139 | 4/2000 |
| WO | WO-0057549 | 9/2000 |

OTHER PUBLICATIONS http://ojs.academypublisher.com/index.php/jnw/article/viewFile/0507792799/1935, Li, J. et al., Jul. 2010, pp. 792-799; vol. 5; Issue No. 7.

* cited by examiner

*Primary Examiner* — Idriss N Alrobaye
*Assistant Examiner* — Getente A Yimer
(74) *Attorney, Agent, or Firm* — Preetam B. Pagar (57) ABSTRACT

Techniques described herein provide for sending and receiving messages. The messages are associated with streams. Indicators associated with the streams determine if the messages are sent.

9 Claims, 8 Drawing Sheets

INDICATORS FOR STREAMS ASSOCIATED WITH MESSAGES

BACKGROUND

Data networks are used to allow many types of electronic devices to communicate with each other. Typical devices can include computers, servers, mobile devices, game consoles, home entertainment equipment, and many other types of devices. These types of devices generally communicate by encapsulating data that is to be transmitted from one device to another into data packets. The data packets are then sent from a sending device to a receiving device. In all but the simplest of data networks, devices are generally not directly connected to one another.

Instead, networking devices, such as switches and routers, may directly connect to devices, as well as to other networking devices. A network device may receive a data packet from a device at an interface that may be referred to as a port. The network device may then forward the data packet to another port for output to either the desired destination or to another network device for further forwarding toward the destination. The bandwidth available in a network device for such data transfer may be finite, and as such it would be desirable to make such transfers as efficient as possible.

BRIEF DESCRIPTION OF THE DRAWINGS

FIGS. 4($a$-$c$) depict an example of stopping and restarting a stream.

DETAILED DESCRIPTION

A network device may receive data packets from a plurality of sources and will route those data packets to the desired destination. The network device may receive the data packets through ports that are connected to external packet sources. The network device may then route those data packets to other ports on the network device through a switch fabric. The switch fabric allows for packets to be sent from one port on the network device to a different port. The network device may then output the data packet on a different port.

In many cases, it is desirable that an order between data packets be maintained. For example, a source may be sending a large file to a destination. The file may be broken up into many data packets. The destination may expect those packets to be received in order. Although higher layer protocols exist to address the situation of packets being received out of order, those protocols may require duplicate transmission of data packets once an out of order data packet is received. Such duplicate transmissions would lead to redundant data packet transfers within the switch fabric, which results in a reduction of the efficiency of the network device.

Although it is desirable for data packets to be output in the same order as received, solutions to achieve this result should not lead to additional inefficiency. A switch fabric may be segmented into multiple communications channels, each with a finite bandwidth. A characteristic of a communications channel may be that messages that are input to the channel are output in the same order as they were input. Although restricting transfer of, data packets to a single channel would result in the packets being sent in the correct order, such a solution may not utilize the switch fabric bandwidth efficiently. While data packets are being sent over the finite bandwidth of a specific channel, other channels may have available bandwidth. Thus, the available bandwidth may be wasted if the data packets are restricted to a single channel.

One way to overcome the problem of restricting data packet transfer to a single channel is to use ordered request messages. Each data packet is associated with a request message and the request messages may be sent in the desired order over a designated communications channel. Because of the characteristics of a communications channel, the request messages will be received in order. Thus, the destination node is made aware of the desired order of the data packets. The data packets themselves may then be sent to the destination node in any order over any communications channel. Because the destination node is aware of the desired ordering from the request messages; the destination node is able to output the data packets in the desired order.

The solution described above ensures data packets are output in the correct order, so long as the request messages are received and processed in order. However, a problem may arise if the destination node is unable to process a request message. For example, a destination node may be unable to process a request message because insufficient resources, such as memory, are available on the destination node. Because proper ordering of output of data packets relies on the ordered receipt and processing of request messages, failure to process a request message may result in data packets being output in an incorrect order.

Example embodiments described herein overcome this problem by providing techniques for stopping and restarting a stream of request messages that are sent over the designated communications channel. If a request message is unable to be processed by the destination node, the destination node may inform the source node to stop sending additional request messages and may discard any further request messages. The source node, at a later point in time, may resume sending request messages, beginning with the request message that was the first request message that was unable to be processed. Thus, the ordering of request messages is preserved.

Figure 1:
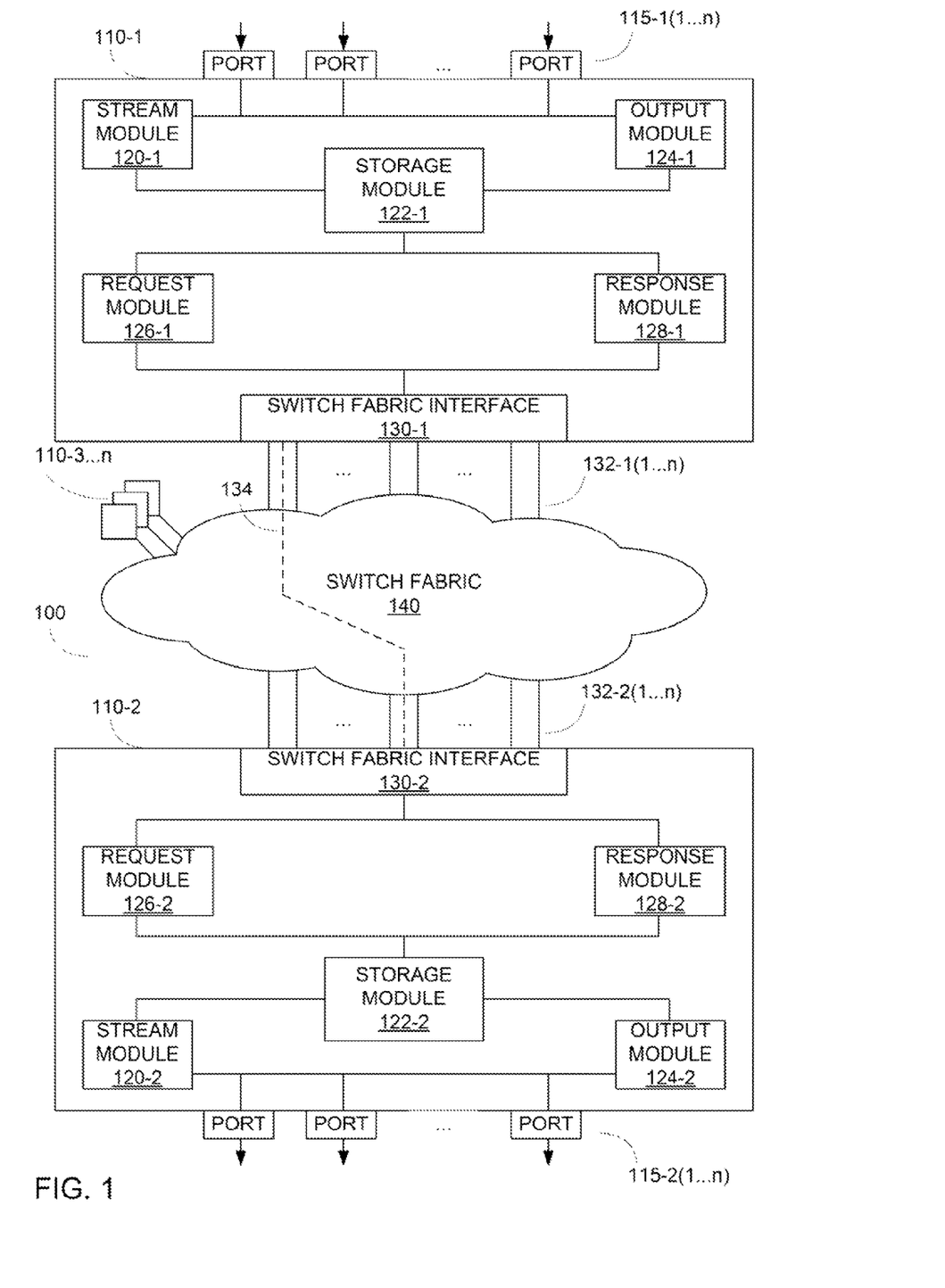
FIG. 1 is a high level block diagram of an example of a network device.

FIG. 1 is a high level block diagram of an example of a network device. The network device 100, such as a switch or router, may implement the example techniques described herein in order to provide for the ability to stop and restart a sequence of ordered request messages. The network device may include a plurality of nodes 110-1 ... $n$. For purposes of clarity, only two nodes are shown in detail in FIG. 1, however it should be understood that there may be any number of nodes. Furthermore, all nodes are capable of both sending and receiving packets, and may be doing so simultaneously. However, for ease of description, FIG. 1 will be described in terms of a source node 110-1 which may receive data packets from external sources and send request messages for the data packets to a destination node 110-2. The destination node may receive the request messages and respond with an indication of the ability of the destination node to accept the request messages. It should be understood that in operation, a node may act as both a source node and a destination node at the same time for different data packets or even for the same packet.

Source node 110-1 may include a plurality of ports 115-1 (1 . . . *n*). Ports 115-1 may be used to connect to external sources of data packets, such as computers, servers, or even other network devices. The source node 110-1 may receive data packets from these external sources through the ports. The number of ports that exist on a source node may be determined by the design of the network device. For example, in some modular switches, capacity may be added by inserting an additional line card containing 4, 8, 16, or 32 ports. The line card may also contain a node chip to control the data packets sent to and received from the ports. In some cases, depending on the number of ports included on a line card, more than one node chip may be required. However, for purposes of this explanation, a set of ports may be controlled by a single node chip.

The node chip, which may simply be referred to as a node, may typically be implemented in hardware. Due to the processing speed requirements needed in today's networking environment, the node may generally be implemented as an application specific integrated circuit (ASIC). The ASIC may contain memory, general purpose processors, and dedicated control logic. The various modules that are described below may be implemented using any combination of the memory, processors, and logic as needed.

The source node 110-1 may include a stream module 120-1, a storage module 122-1, an output module 124-1, a request module 126-1, a response module 128-1 and a switch fabric interface 130-1. The stream module 120-1 may receive all the data packets received from the ports 115-1. The stream module may then classify the data packets into streams. A stream is an ordered set of data packets that may be output in the same order as exists within the stream. For the present example, the criterion used to classify data packets into streams is unimportant. What should be understood is that a stream may be a set of data packets in a specified order. These data packets should be output from a port of the network device 100 in the same order as they exist in the stream. There is no requirement as to how the data packets are transferred within the network device.

As the stream module 120-1 receives data packets from the ports 115-1, the data packets are added to the stream, and stored in storage module 122-1. Storage module 122-1 may be any form of suitable memory, such as static or dynamic random access memory (SRAM/DRAM), FLASH memory, or any other memory that is able to store data packets.

The request module 126-1 may be notified of data packets as they are added to the stream. The request module may determine which node the data packet should be sent to and may generate and send a request message to the determined destination node to inform the destination node that a data packet is available for delivery. The request module may issue request messages to the destination node in the same order as the data packets were added to the stream. Thus, the request messages reflect the order in which the data packets were added to the stream. The request module may send the request messages to the determined destination node through a switch fabric interface 130-1.

The switch fabric interface 130-1 is the interface through which a node communicates with the switch fabric 140. The switch fabric interface may contain communications links 132-1 (1 . . . *n*). Although depicted as separate physical links, it should be understood that there may also only be one physical link to the switch fabric, with multiple logical communications links defined within the single physical interface. The destination node 110-2 also contains a switch fabric interface 130-2 and associated communications links 132-2 (1 . . . *n*). The combination of a communications link on the source node, a path through the switch fabric 140, and a communications link on the destination node may form a communications channel. A characteristic of a communications channel is that messages sent over the channel may be received in the order sent. No such guarantee exists for messages sent using different communications channels, and those messages may be received in any order. A specific communications channel is designated for each stream on the source node 110-1. For example, a designated communications channel 134 may be used for all request messages for the stream that is being described in this example. The request module may use the designated communications channel to send all request messages for a stream. Because all request messages sent for the stream may use the designated communications channel, it is guaranteed that those request messages will be received in the same order by the destination node 110-2. It should be noted that although there is a designated communications channel for each stream, this does not mean that every stream will use the same communications channel.

The switch fabric 140 is used to connect the nodes 110-1 . . . *n*. The switch fabric may receive messages from a source node 110-1 through the switch fabric interface 130-1 and may route those messages to a destination node 110-2. The destination node 110-2 may receive the messages through the switch fabric interface 130-2. The same applies for communication in the reverse direction. The switch fabric may be segmented into multiple communications paths. Each communications path may have a finite bandwidth. Messages sent over a specific communications path may be delivered in the same order that they were sent. As mentioned above, a combination of communications links at the source and destination nodes along with a path through the switch fabric may form a communications channel. Messages sent through the communications channel may be received in the order that they were sent.

The destination node 110-2 has a similar structure to the source node 110-1, however the various modules may provide different processing when acting as a destination node. The request messages may be received, in order, by the request module 126-2. The request module 126-2 may determine if the data packet associated with the request message can be processed. For example, if storage space in the storage module 122-2 for the data packet associated with the request message cannot be allocated, the request message cannot be processed. As another example, the destination node may be overloaded and is currently unable to process the request message. The request module 126-2 may determine if the request message is accepted.

As the request messages are all sent over the designated communications channel 134, the request messages may be received in the same order as packets were added to the stream. Thus, the destination node is made aware of the ordering of the data packets in the stream based on the order of the request messages. However, if a request message is not able to be processed, it would not make sense to accept any later received request messages, as those request messages would then be out of order. This is because the request message that was not accepted would be missing from the destination node. As such, when the request module 126-2 determines that a request message cannot be accepted, the destination node may inform the source node to stop sending additional request messages.

The destination node 110-2 may use the response module 128-2 to send a response message to the source node. The response message may be sent over any communications channel. There is no requirement to use the designated communications channel 134. The response messages therefore may be received in any order by the source node 110-1. The response message may indicate if the request message is being accepted by the destination node.

The response module 128-1 on the source node may receive the response message. The response message may indicate if the destination node is accepting the request message. If the destination node is not accepting the request message, the response module may cause the source node to stop issuing new request messages for the stream. As explained above, if a request message is not accepted, additional request messages for the stream should not be sent, as those request messages cannot be accepted. In addition, the response module 128-1 may determine when responses to all request messages have been received. In cases where issuing new request messages has been stopped, it is necessary to restart issuing request messages at some point. The response module 128-1 may determine when request message should be issued again based on receipt of responses to all outstanding request messages. The process of stopping and restarting request messages will be described in further detail with respect to FIGS. 4(*a-c*).

The source node 110-1 and the destination node 110-2 may exchange the data packet associated with a request message over any communications channel of the switch fabric and in any order. For example, the source node may send the data packets to the destination node autonomously. In other implementations, the destination node may initiate transfer of each data packet from the source node. Any mode of transferring the data packets associated with request messages is suitable and the example implementations described herein do not rely on any specific method of transferring data packets. This beneficial result may be achieved through the ordered request messages, the ability to stop and restart ordered request messages, and the output module 124-2.

As mentioned above, request messages are sent over a designated communications channel 134, thus guaranteeing that the request messages will be received by the destination node 110-2 in order. If a particular request message cannot be accepted and is refused, no additional request messages may be accepted until the refused request message is accepted. Thus, the order of the accepted request messages may reflect the order of the data packets in the stream. In other words, the order of the data packets is conveyed to the destination node through the request messages alone.

All other messages and data packet transfers may be sent over any communications channel. Thus, there is neither a guarantee nor a requirement that messages, other than request messages, be received in order. For example, a data packet that is later in the stream of data packets may be received by the destination node prior to one that is earlier in the stream. As another example, a response message for a request message that is later in the stream may be received before a response message for a data packet that is earlier in the stream. The output module 124-2 may maintain the expected order of data packets based on the request messages. The output module 124-2 may output the data packets to a port 115-2 (1 . . . *n*) of the destination node 110-2 in the same order as the stream, based on the order of the request messages.

Data packets within a stream may thus be output from a port of the destination node in the same order as the stream, while only requiring that request messages be sent in order. Because ordering of the data packets is maintained through the request messages only, there is no requirement that the data packets be sent in any order or over a specific communications channel. As a communications channel typically has a finite bandwidth, the ability to use any available communications channel to send data packets increases efficiency, as there is no need to wait for a specific communications channel to become available. Furthermore, because any communications channel may be used to send data packets, efficiency through the switch fabric may be increased because multiple data packets may be transmitted through the switch fabric simultaneously over different communications channels.

The destination node has the ability to cause the source node to stop sending request messages if insufficient resources are available at the destination node to process the request messages. The request messages may be restarted at a later point in time, once sufficient resources are available at the destination node. The ability to stop and restart a stream of request messages beneficially allows the destination node to exert a form of flow control on the source node. Furthermore, stopping and restarting the stream of request messages may be done such that the destination node is made aware of the ordering of the data packets through the use of the request messages only.

Figure 2:
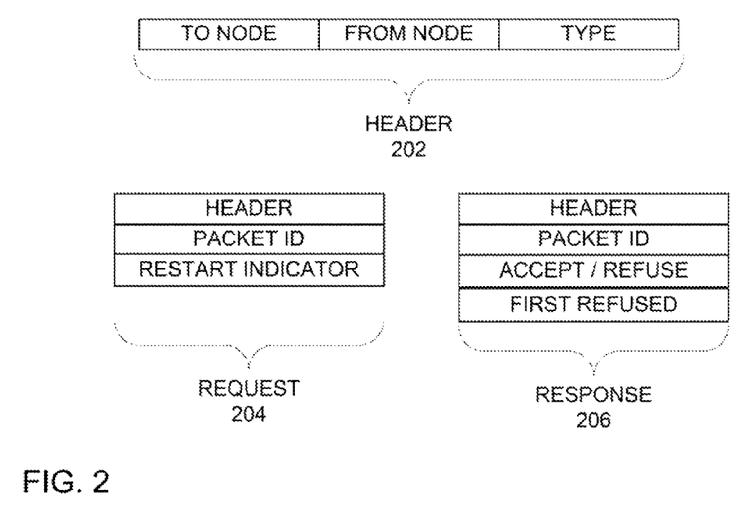
FIG. 2 depicts an example of message content and structure that may be used in an embodiment.

FIG. 2 depicts an example of message content and structure that may be used in an embodiment. The messages described in FIG. 2 are an example of those that may be used with the system as described in FIG. 1. In this example implementation, each message includes a header 202. The header may include a 'To Node' field which identifies the node that the message is intended for. Also included is a 'From Node' field which identifies the node that sent the message. The node identifications may used by the switching fabric to properly transfer messages from the sending node to the intended recipient node. In addition, the header may also include a 'Type' field which is further used to identify the contents and structure of the message when received.

In the present example implementation there are two basic message types that are used to convey the order of data packets in a stream from the source node to the destination node. The messages may also be used to control starting and stopping of request messages for the stream. Each message type includes the header 202 which will not be described further. The first message type is the request message 204. The request message may be used by a source node to notify a destination node that a data packet is available for delivery. The request message may include a 'Packet ID' field. The 'Packet ID' field may be used to identify a particular stream as well as an individual data packet within that stream. For example, a first portion of the 'Packet ID' may identify the individual stream within the source node that is the origin of the data packet, while a second portion may identify an individual data packet within that stream. In an alternate example implementation, the second portion of the 'Packet ID' may indicate the location in memory where information related to the packet is stored. Regardless of how implemented, the 'Packet ID' field may be used by the source and destination node to identify the data packet and the stream that is referred to in the request message.

The request message 204 may also include a 'Restart Indicator' field. The 'Restart Indicator' field may be used by the source node to convey to the destination node that the source node is attempting to restart a stream that had previously been stopped. For example, if a stream has been stopped and the source node is now attempting to restart the stream, the source may set the 'Restart Indicator' field to true. The destination node may be able to differentiate between a request message that is attempting to restart a previously stopped stream and a request message for a stream that has not been stopped. Restarting a stream will be described in further detail with respect to FIGS. 4(*a-c*).

The second message type is the response message 206. The response message may be used by a destination node to notify the source node that a request message has been received. The response message may include a 'Packet ID' field that identifies the data packet as described with respect to the request message. When the source node receives the response message, the 'Packet ID' field may be used to match the response message with the originally sent request message. For example, the 'Packet ID' field may be used when restarting a stream, as will be described below.

The response message may also include an 'Accept/Refuse' field. The 'Accept/Refuse' field may be used by the destination node to inform the source node if the request message associated with a 'Packet ID' is being accepted or refused. For example, if the destination node receives a request message and is able to process the request message, the destination node may return a response message indicating that the request message was accepted. Likewise, if the destination node is unable to process the request message, a response message indicating a refusal may be sent to the source node. The response message indicating refusal may be sent if the destination node lacks sufficient resources to process the request message. A response message indicating refusal may be used to notify the source node that no additional request messages should be sent for that stream. Also included in the response message is a 'First Refused' field. The 'First Refused' field may be used by the destination node when refusing a request message to notify the source node that this is the first request message in the stream that is being refused. The response message indicating first refusal informs the source node that the request message that was refused may need to be sent again at a later time and indicates the 'Packet ID' from which the stream should be restarted. Stopping and restarting a stream of request messages will be described in further detail with respect to FIGS. 4(a-c).

Figure 3:
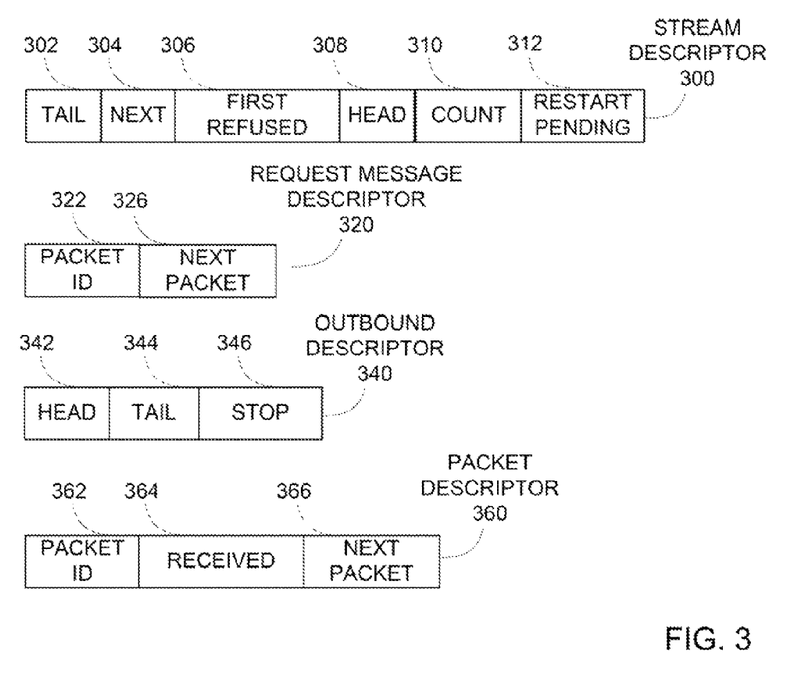
FIG. 3 depicts an example of data structures that may be used to maintain the status of request messages.

FIG. 3 depicts an example of data structures that may be used to maintain the status of request messages. A stream descriptor 300 in combination with request message descriptors 320 may be an example of a source node data structure that is used to indicate the status of each data packet in the stream of ordered data packets. The status may be maintained at least until the data packet is successfully sent to the destination node. A stream descriptor may exist for each stream of ordered data packets on a source node. The stream descriptor may generally be a handle for a list, such as a linked list, of request message descriptors. Each request message descriptor may be associated with a data packet in the stream.

The stream descriptor 300 may contain several data fields. The tail (T) field 302 may be a pointer that points to the last request message descriptor in the list of request message descriptors. Likewise, the head (H) field 308 may be a pointer that points to the first request message descriptor in the list of request message descriptors. The stream descriptor may also contain a next (N) field 304 which is a pointer to the request message descriptor that is the next request message to be sent to the destination node.

The stream descriptor 300 may also contain a first refused (FR) field 306 which may be a pointer to a request message descriptor that was refused by the destination node and the destination node indicated that the refusal of the request message was the first refusal for the stream. In an alternate implementation, the first refused field may store the packet id associated with the request message that is being refused. Regardless of implementation, the first refused field may be used by the source node to determine where a stream should be restarted. The stream descriptor may also include a count (C) field 310 which may indicate the number of request messages that have been sent for which no response message has been received. The count field may be incremented as each request message is sent and decremented when a response message is received.

The stream descriptor 300 may also include a restart pending (RP) field 312. The restart pending indicator may be used to indicate a stream that has been stopped. In general, no new request messages are sent for a stream that has the restart pending indicator set.

The request message descriptor 320 may also contain several data fields. The packet id field 322 may identify the data packet that is associated with the request message descriptor. As mentioned above, the packet id may not only identify the particular packet within a stream, but may also identify the stream itself. The packet id field may be used to match request and response messages, such that when a response message is received, it can be determined which request message the response message is intended to reference.

The request message descriptor may also include a next packet 326 field. As mentioned above, each request message descriptor may be associated with a data packet in a stream and are in the same order as the data packets in the stream. The request message descriptors may form a list, such as a linked list, that is in the same order as the data packets in the stream. The next packet field may be used to indicate which request message descriptor is the next descriptor in the order. When a new data packet is added to the stream, a new request message descriptor may be allocated and appended to the end of the list of request message descriptors. The next packet field of the request message descriptor that was previously at the tail of the list may be set to point to the newly allocated request message descriptor. The tail pointer may then be set to point to the newly added request message descriptor.

An outbound descriptor 340 in combination with packet descriptors 360 may be an example of a destination node data structure that is used to indicate the status of each data packet for which a request message has been received. The status may be maintained at least until the data packet is received from the source node. An outbound descriptor may exist for each stream of ordered data packets from which the destination node may receive request messages. The outbound descriptor may generally be a handle for a list, such as a linked list, of packet descriptors. Each packet descriptor may be associated with a data packet in a stream.

The outbound descriptor 340 may include a head pointer 342 which points to the first packet descriptor in the list of packet descriptors. The outbound descriptor may also include a tail pointer 344. The tail pointer may point to the last packet descriptor in the list of packet descriptors. The outbound descriptor may also include a stop 346 indicator. The stop indicator may indicate if the stream associated with the outbound descriptor is currently stopped. No new request messages for a stopped stream may be accepted unless certain conditions apply. These conditions will be described in further detail with respect to FIGS. 4(a-c).

A packet descriptor 360 may include several fields. A packet descriptor may include a packet id 362 field which identifies a particular data packet as well as the stream from which the data packet originated. The packet id field may be used to match request and response messages as discussed above. The packet descriptor may also include a received 364 field. The received field may be used to determine if the data packet associated with the packet descriptor has been received by the destination node.

The packet descriptor may also include a next packet 366 field. As mentioned above, the packet descriptors may form a linked list that is in the order of the received request messages.

The next packet field may be used to indicate the next packet in the list. When a new request message is received and accepted, a new packet descriptor may be allocated. The next packet field of the packet descriptor pointed to by the tail pointer of the outbound descriptor may be set to point to the newly allocated packet descriptor. The tail pointer may then be set to point to the newly allocated packet descriptor. Operation of the outbound descriptor and the packet descriptors will be explained in further detail with respect to FIGS. 4(a-c).

Thus, the outbound descriptor maintains a list of ordered packet descriptors which are each associated with a data packet and the ordering is the same as the ordering of the data packets in the stream of data packets. Proper ordering of the data packets in a stream can be conveyed to the destination node through the request messages independently, without having to send the data packets themselves in order.

Figure 4A:
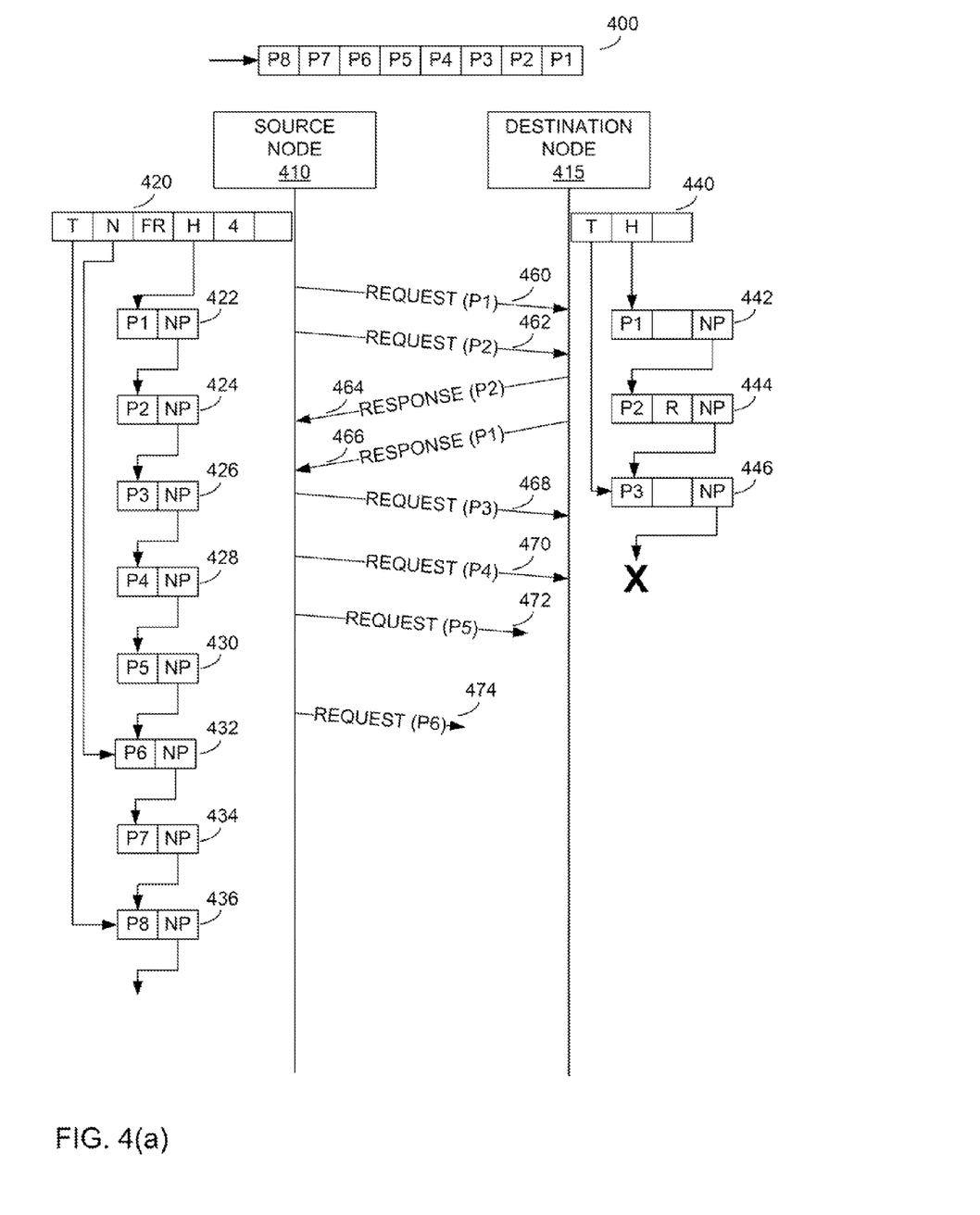
Figure 4B:
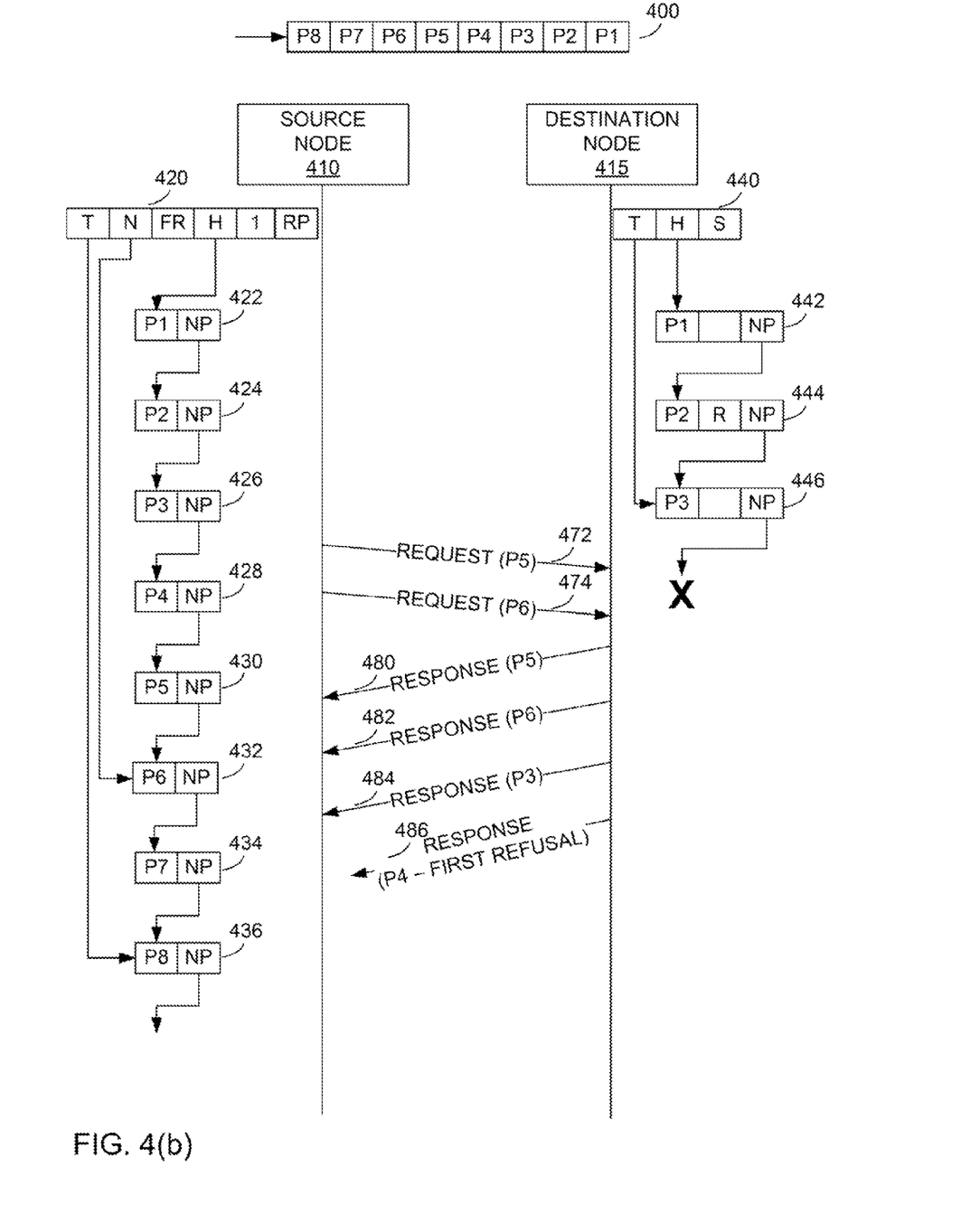
Figure 4C:
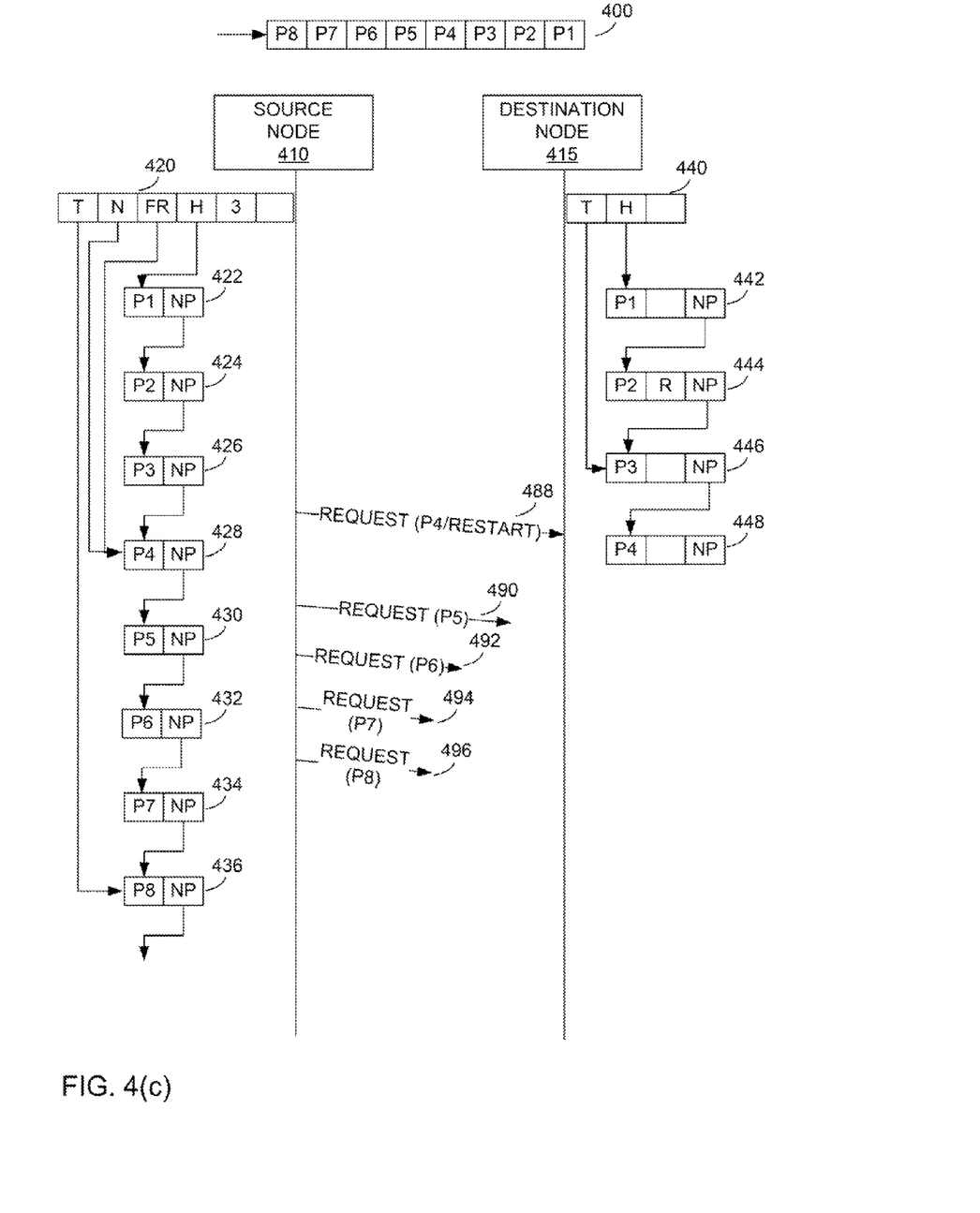

FIGS. 4(a-c) depict an example of stopping and restarting a stream. FIGS. 4(a-c) depict an example of data packets 400 that make up a stream of data packets at a source node 410. Each of the data packets 400 is labeled with a number to indicate the order of the data packet within the stream. Thus, data packet P1 is before P2, which is before P3, and so on. The stream of data packets may exist on a source node 410. The data packets may be transferred to the destination node 415. The data packets may be output from a port of the destination node 415 in the same order as the data packets in the stream of data packets 400. The ordered output is beneficially achieved without requiring that the data packets be transmitted in any particular order or over any particular communications channel.

Stream descriptor 420 may be a descriptor that has been defined on the source node 410 for the stream of data packets 400. Each stream on the source node may be associated with a stream descriptor and stream descriptor 420 represents one such stream. Each data packet in the stream may have a request message descriptor associated with the data packet and associated with the stream descriptor. As shown, request message descriptors 422-436 may be arranged to form a linked list. The ordering of the linked list may reflect the ordering of the data packets in the stream 400.

The stream descriptor 420 and the request message descriptors 422-436 may contain the fields that were described in further detail with respect to FIG. 3. The stream descriptor may include a tail pointer (T), a next pointer (N), a first refused pointer (FR), and a head pointer (H). The stream descriptor may also include a count field which may represent the number of outstanding request messages, as well as a restart pending indicator which indicates if the stream of request messages is currently stopped. Each request message descriptor may include a packet id, which identifies a particular data packet that is associated with the request message descriptor. A next pointer (NP) may be included to establish the order of the request message descriptors. Each of these pointers and fields will be described in further detail below.

As data packets are added to a stream, a new request message descriptor for the data packet may be allocated and appended to the stream descriptor. For example, when packet P8 was added to the stream, a new request message descriptor 436 may have been allocated. The packet id P8 may be stored in the new request message descriptor. The next packet pointer of the request message descriptor that was previously pointed to by the tail pointer may be set to point to the newly allocated request message descriptor. The tail pointer may then be reset to point to the newly added request message descriptor. By following this process, new request message descriptors are added to the end of the list of request message descriptors in the same order as the data packets. As such, the list of request message descriptors reflects the ordering of the data packets in the stream.

In operation, the source node may maintain a next (N) pointer which points to the next request message descriptor for which a request message should be sent. The source node may send a request message to the destination node for the request message descriptor pointed to by the next pointer and then advance the next pointer to the request message descriptor pointed to by the next packet field of the request message descriptor. As shown, the next pointer may have initially pointed to request message descriptor 422. A request message 460 may have been sent to the destination node 415 for the data packet associated with request message descriptor 422. The next pointer may then have been advanced to the next request message descriptor 424 which is pointed to by the next packet field of request message descriptor 422.

The process of sending a request message and advancing the next pointer may continue as long as the destination node is able to accept the request messages. As shown, request messages 460, 462, 468, 470, 472, and 474 may have been sent for the corresponding request message descriptors 422, 424, 426, 428, 430, and 432. It should be understood that the source node may send request messages as long as the stream is not stopped. Thus, the source node does not wait for a response message to be received prior to sending the next request message. As such, there may be multiple request messages outstanding at any given time.

Each time a request message is sent, the count field may be incremented. Each time a response is received, the count field may be decremented. Thus, the count field indicates the number of request messages that have been sent that are currently awaiting responses. As shown in FIG. 4(a), the count field is set to four. The count is four because a total of six request messages 460, 462, 468, 470, 472, and 474 have been sent, but only two response messages 464 and 466 have been received. Thus, there are currently four request messages awaiting responses.

Destination node 415 may maintain an outbound descriptor 440 for each stream. The outbound descriptor may contain a head pointer and a tail pointer. The head pointer may point to the first packet descriptor in a list of ordered packet descriptors, while the tail pointer points to the last packet descriptor in the list. The outbound descriptor may also include a stopped indicator, which indicates if the stream has been stopped. As shown in FIG. 4(a) the stopped indicator is currently cleared, indicating that the stream associated with the outbound descriptor is currently not stopped. The destination node may maintain an outbound descriptor for every stream in the system. In a different example implementation, the destination node may maintain a data structure (not shown) that is a bit field, with each bit associated with a stream. Setting the bit associated with a stream may indicate that the stream has been stopped. What should be understood is that the destination node maintains a stopped status for each stream of data packets that may be sent to the destination node.

The destination node 415 may receive the request message 460 that was sent from the source node 410. Upon receipt of the request message, the destination node may allocate a packet descriptor 442 and associate the packet descriptor with the data packet identified in the request message. The packet descriptor may be added to the list of packet descriptors. As shown, a request message 460 has been received for packet P1, and packet descriptor 442 has been allocated. A request message 462 has also been received for packet P2 and a packet descriptor 444 has been allocated. The packet descriptor 444 is added to the linked list of packet descriptors at the end of the list. A request message 468 has also been received for packet P3 and a packet descriptor 446 has been allocated, and appended to the list of packet descriptors.

As described above, request messages for a single stream are sent over a communications channel that is designated for the stream. The request messages will be received in the same order that they are sent. Because the request messages are sent by the source node in the same order as the stream of data packets, it is ensured that the packet descriptors in the destination node will be in the same order as the data packets in the stream of data packets. The destination node may use this ordering to ensure that data packets are output in the correct order, once received, without imposing any order on how the data packets are sent from the source node to the destination node.

For example, packet descriptor 444 has the received field set to R, which indicates that the data packet associated with this packet descriptor has already been received. However, the correct ordering of the data packets is determined by the list of packet descriptors. Because there is a packet descriptor 442 ahead of packet descriptor 444, the destination node may not output packet P2 until the data packet for P1 is received. The next data packet to be output may be maintained by the head pointer of the outbound descriptor. When the head pointer points to a packet descriptor whose associated data packet has been received, that data packet may then be eligible for output. The head pointer may then be advanced to the next packet descriptor. Thus, the data packets may be output in the same order as they exist in the stream of data packets. This output mechanism only needs request messages to be sent in order and beneficially places no restrictions on the order that data packets themselves are sent from the source to the destination node.

Once a request message has been received, and a new packet descriptor allocated, the destination node may send a response message to the source node indicating that the request message was accepted. In general, an acceptance of a request message indicates that a packet descriptor was added to the outbound descriptor, and the destination node is aware of the order in which the data packet should be output. As shown, the destination node has sent response messages 464 and 466 to the source node to indicate that the request messages for packets P1 and P2 have been received and processed, as described above. Beneficially, example implementations discussed herein do not require that response messages be sent in any order or over a designated communications channel. Thus, as shown, response message 464 for packet P2 may be received by the source node before the response message 466 for packet P1, with no adverse impact on operation.

Upon receipt of the response messages 464 and 466 the source node may decrement the count field. If no additional request messages had been sent, the count field would indicate zero outstanding requests (not shown). The count field is used to indicate the number of request messages that are awaiting a response.

As shown in FIG. 4(*a*), request message 470 for packet P4 has been received by the destination node. However, the destination node may not be able to accept the request message. For example, the destination node may currently be overloaded and does not have available processing power to process the request message. As another example, the destination node may not have sufficient memory resources and is not able to allocate a packet descriptor for packet P4. Regardless of the reason why the destination node is unable to accept a request message, the destination node may inform the source node that a request message is being refused, and that no additional request messages should be sent or may be accepted until the refused request message is accepted.

The reason that later received request messages are refused once a request message is refused is that to accept such a request message would result in the list of packet descriptors no longer reflecting the order of the data packets in the stream. As shown in FIG. 4(*a*), request messages 472 and 474 for packets P5 and P6 may have been sent from the source node but are still in flight through the switch fabric. In other words, request messages 472 and 474 were sent before the source node was notified that no additional request messages should be sent. It is possible that that the condition that caused request message 470 for packet P4 to be refused may have cleared by the time request message 472 for packet P5 is received. If request message 472 is accepted, this would result in the order of the packet descriptors jumping from P3 to P5, which is an undesirable result.

FIG. 4(*b*) is a continuation of FIG. 4(*a*). Once the destination node has determined that the request message for packet P4 cannot be accepted, the destination node may set the stopped indicator for the stream in the outbound descriptor 440. Because the request message for packet P4 is the request that is causing the stopped indicator to be set, the response will indicate that packet P4 is the first refused packet. Use of the first refused packet will be described below. As shown, the S in the outbound descriptor indicates that the stream has been stopped. When the stopped indicator for the stream is set, the destination node may automatically refuse any request messages that do not include a special indicator referred to as the restart indicator. The restart indicator will be described in further detail below.

As shown, at some point the request messages 472 and 474 for packets P5 and P6 are received by the destination node. Because the stopped indicator is set, the destination node may send responses 480 and 482 indicating refusal of the request messages for packets P5 and P6. Because the stopped indicator was already set when request messages 472 and 474 were received, response messages 480 and 482 will not include the first refused indicator. Upon receipt of any response message indicating refusal of a request message, the source node may set the restart pending indicator (RP) in the stream descriptor 420 for the stream. The source node may discontinue sending request messages for the stream until the restart pending indicator is cleared, which will be described further below. The source node may set the restart pending indicator regardless of the state of the first refusal indicator in the response message.

The source node may decrement the count as each response message is received. As shown, the count is a one, because the response message 486 for packet P4 has not yet been received, but response messages for all other request messages have been received. Once the response for packet P4 is received, the count may go to zero, and the stream is eligible to be restarted. The response message 486 for packet P4 may have the first refusal indicator set. As noted above, the request message associated with packet P4 is the first request message that is being refused. As such, the response message will convey this information to the source node. The first refusal information may be used when the stream is restarted. Restarting the stream will be described with respect to FIG. 4(*c*).

As has been mentioned previously, the example implementations presented herein place no ordering requirement on any messages other than the request messages. Thus, the response messages may be received by the source node in any order without any impact on the operation of the system, as the system behavior is the same regardless of the order in which responses are received. As shown, the response message 484 for packet P3 may be received after other response messages for later packets.

The response message 486 is for packet P4, which is the packet that originally caused the stream to stop. However, the response for packet P4 may be the last response received. The source node is able to stop the stream without having to wait for the response that includes the first refused indicator. One of the reasons this is possible is that the source node beneficially stops the stream of request messages upon receipt of any response that indicates a refusal. It is not required that the response be for the first packet that is being refused.

FIG. 4(*c*) depicts the system after the response message for packet P4 has been received. The response message for packet P4 included the first refused indicator. The source node may set the first refused indicator to identify the request message descriptor that is associated with packet P4. By doing so, the source node can keep track of the first refused request message. When it is time to restart the stream, the source node will begin issuing request messages from the request message descriptor identified by the first refused indicator. At this point, the count may have reached zero because a response has been received for all request messages that have been sent. It should be understood that this does not mean that all request messages were accepted, but rather that a response was received for each request message. The source node may now clear the restart pending indicator. The source node may then set the next pointer to point to the request message descriptor that is identified by the first refused indicator. This is done because the first refused indicator identifies the first request message descriptor in the list of request message descriptors that has not yet been accepted by the destination node. The source node may begin sending request messages starting with the next pointer, as was described in FIG. 4(*a*), with a slight modification described below.

As mentioned above, once the stopped indicator is set for a stream on the destination node, the destination node may automatically refuse all request messages for the stream, absent the presence of a restart indicator. Whenever the source node clears the restart pending indicator, the first subsequent request message sent may include the restart indicator, as shown in request message 488. In addition, although not shown, when the source node includes the restart indicator in a request message, the first refused indicator is also cleared. Upon receipt of the request message 488 containing the restart indicator, the destination node may clear the stopped indicator for the stream. At that point, the destination node determines if the request message can be accepted. If so, a new packet descriptor 448 is allocated and added to the outbound descriptor as was described with respect to FIG. 4(*a*). The source node continues through the list of request message descriptors and continues to issue request message based on the next pointer. In other words, the process continues from the request message descriptor associated with the request message that initially caused the destination node to stop the stream. Thus, all refused request messages are issued again, in order. Request messages 488, 490 and 492 for packets P4, P5, and P6, which have not yet been accepted, are sent again. The process then continues to send request messages 494 and 496 for packets P7 and P8 because those are the next packets in the stream. Thus, the ordering of the request messages is preserved.

It should be noted that the restart indicator does not ensure that the request message will be accepted. It is entirely possible that the condition that caused a request message to be refused in the first place still exists at the destination node. In such a case, the destination node will again refuse the request message. The destination node will set the first refused indicator to indicate that the request message is the first refused request. The process proceeds as was described with respect to FIG. 4(*b*). In an alternate implementation, the source node may not issue additional request messages until a request message with the restart indicator set has been accepted. Doing so may allow the source node to confirm that the condition that caused the original refusal of the request message has been cleared before sending multiple request messages which may also be refused if the condition has not cleared.

Figure 5:
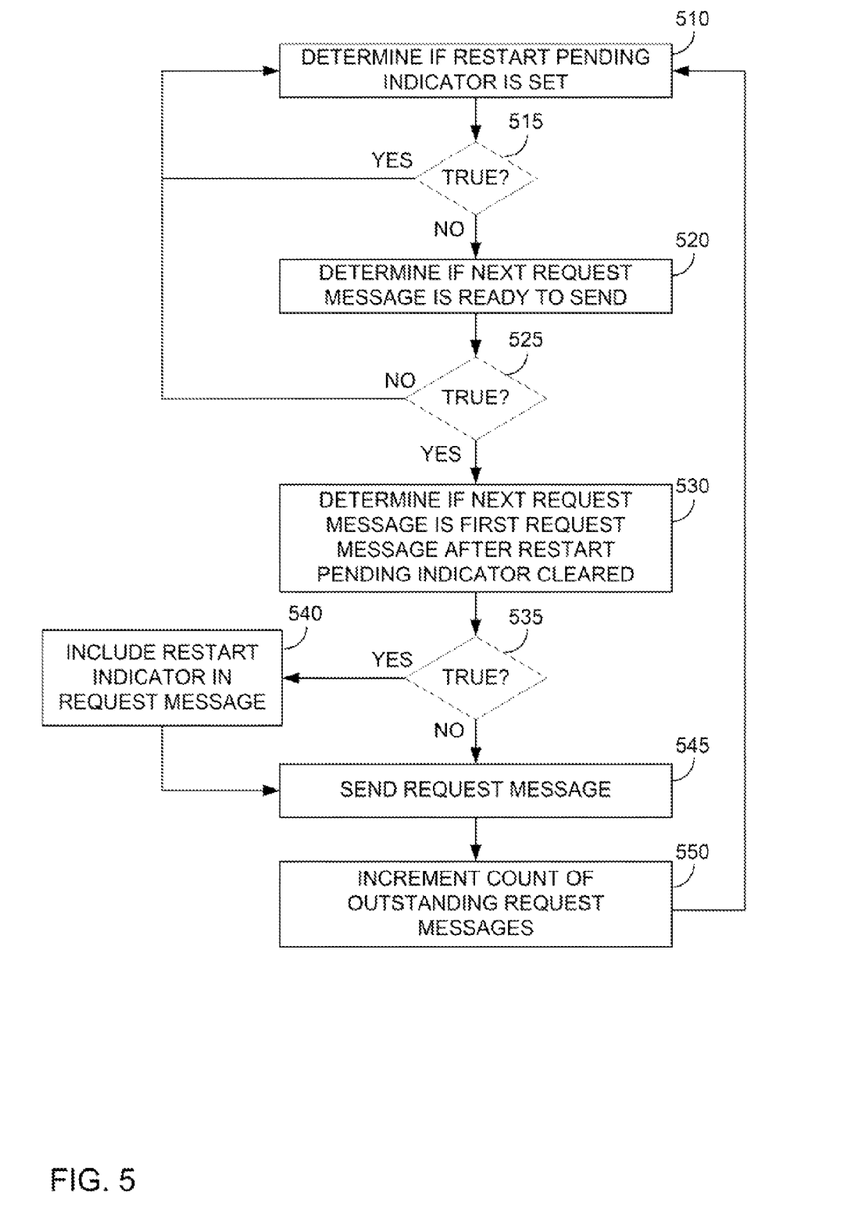
FIG. 5 depicts an example of a high level flow diagram for sending request messages.

FIG. 5 depicts an example of a high level flow diagram for sending request messages. In block 510 it may be determined if the restart pending indicator for the stream is set. A set restart pending indicator may mean that the stream has previously been stopped. In block 515 a decision is made based on the determination in block 510. If the restart pending indicator is set, the result of the decision will be true and the process returns to block 510, without any request messages being issued. No request message may be issued, because the stream is currently stopped. The process may continue the loop between blocks 510 and 515 for as long as the restart pending indicator is set for the stream.

If the restart pending indicator for the stream is not set, block 520, may determine if the next request message is ready to send. The next pointer of the stream descriptor may be examined to determine if the request message descriptor that is pointed to is ready to send. In block 525 a decision based on the determination in block 520 is made. If the next request message is not ready to send, block 525 will not be true and the process may return to block 510. The loop between blocks 510-525 may continue, with no request messages sent, as long as the next request message is not ready to send.

If the next request message is ready to send, it may be determined in block 530 if the next request message to be sent is the first request message after the restart pending indicator was cleared. If the next request message is the first request message to be sent after the restart pending indicator is cleared, it is an indication that the stream was previously stopped and is now being restarted. At block 535 if the determination is true, the process may move to block 540, wherein the restart indicator is included in the request message.

At block 545, a request message may be sent. The request message may be sent from the source node to the destination node. As mentioned above, the request message may include the restart indicator, if the request message is the first request message sent after clearing the restart pending indicator. In block 550 the count of outstanding request messages is incremented. Each time a request message is sent, the count of outstanding request messages is incremented. The count of outstanding request messages may be decremented when a response is received, as will be described with respect to FIG. 6.

The process may then return to block 510. In general, the source node may advance through each request message descriptor in the list of request message descriptors for a stream descriptor. While the restart pending indicator is not set, the source node may continue to issue request messages for the next request in the list, as long as the next request is ready to have a request message issued.

Figure 6:
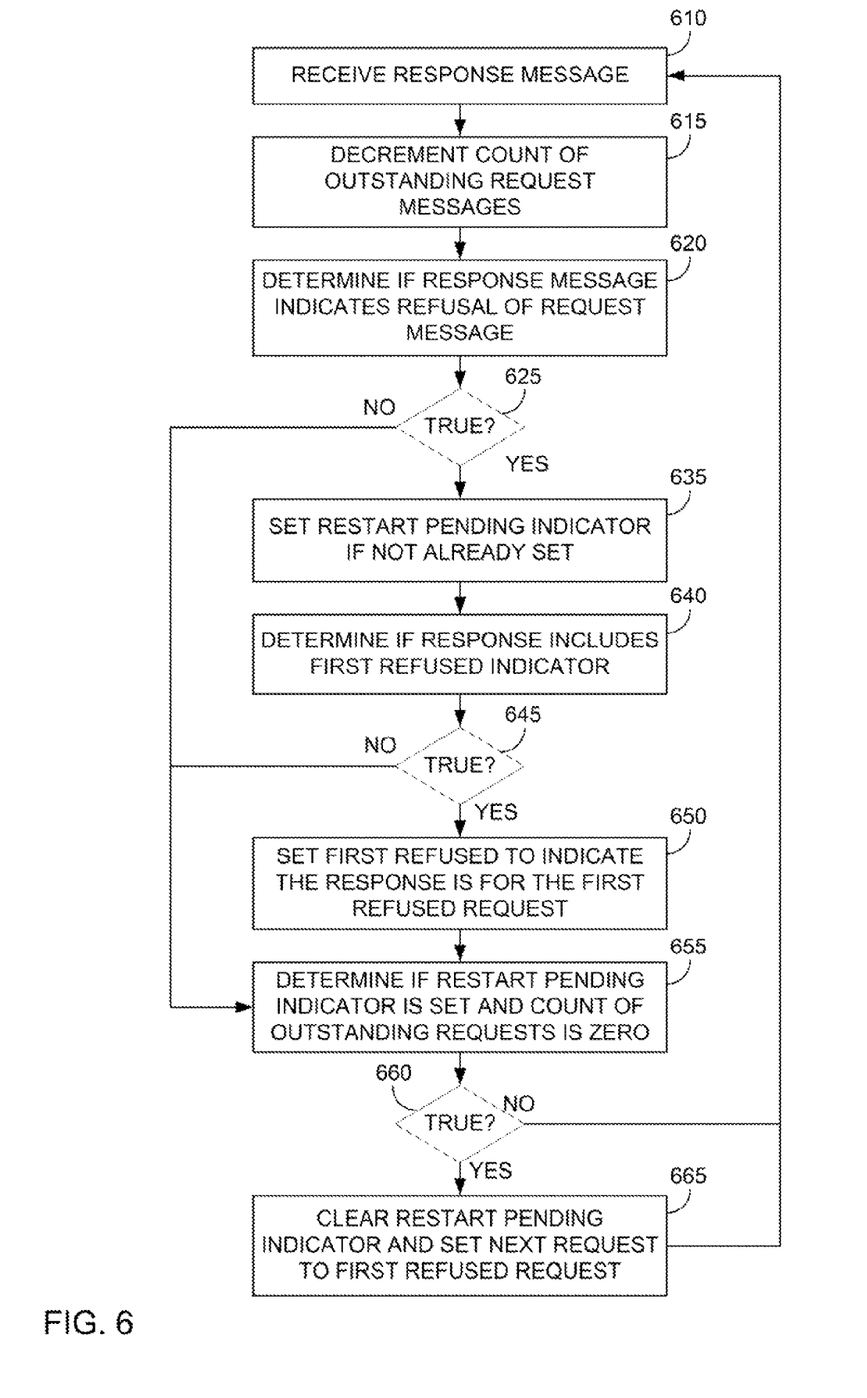
FIG. 6 depicts an example of a high level flow diagram for receiving response messages.

FIG. 6 depicts an example of a high level flow diagram for receiving response messages. In block 610 a response message from a destination node is received at a source node. In block 615 the count of outstanding request messages is decremented. In block 615 it does not matter if the request message is being accepted or refused, as the count of outstanding request messages may be used to keep track of how many request messages are awaiting a response. For purposes of keeping track of how many request messages are awaiting a response, it does not matter if the response is an acceptance or a refusal of a request message.

In block 620 it is determined if the response message received in block 610 indicates a refusal of the request message. If the response message indicates a refusal of the request message, it indicates that the destination node is either attempting to stop the stream or that the stream is already stopped and the response is for a request message that was issued before the source node became aware that the stream should be stopped. In block 625 if it is true that the response message indicates refusal of the request message, the process moves to block 635. Otherwise, the response is an acceptance, and the process moves to block 655.

In block 635, the restart pending indicator for the stream is set, if it is not already set. In some implementations, the restart pending indicator is simply set whenever block 635 is executed. What should be understood is that after execution of block 635, the restart pending indicator is set for the stream, regardless of the initial state. The result of setting the restart pending indicator is that the source node may issue no additional requests for the stream, as was described with respect to FIG. 5.

In block 640 it is determined if the refusal response that is received includes the first refused indicator. At block 645, if it is determined that the response does not include the first refused indicator, the process moves to block 655, which is described below.

If at block 645 it is true that the response does include the first refused indicator, the process moves to block 650. In block 650, first refused is set to identify the request message descriptor that is associated with the data packet indicated in the response. For example, the response message may include a packet id and the packet id may be used to identify the request message descriptor associated with that packet id. As mentioned above, first refused is used to determine where in the list of request message descriptors to begin sending request messages if a stream is stopped.

Regardless of the acceptance/refusal indication of the response message, block 655 determines if the restart pending indicator is set and the count of outstanding request messages is zero. If both of these conditions are true, this indicates that that are no request messages that are awaiting a response and that the stream is currently stopped. At block 660, if the result of the determination in block 655 is not true, the process returns to block 610, to await the next response message.

If the result of block 660 is true, this indicates that the stream is currently stopped, due to the restart pending indicator being set. However, because the count of outstanding request messages is zero, no additional responses are expected from the destination node. Thus, the stream is eligible to be restarted. In block 665 the restart pending indicator is cleared. The next request pointer may then be set to point to the request message descriptor identified as first refused. Thus, when new request messages are issued, the request messages may begin with the first request message that has not been accepted. New request messages may then be issued, as was described with respect to FIG. 5. The process may then return to block 610 to await the next response message.

Figure 7:
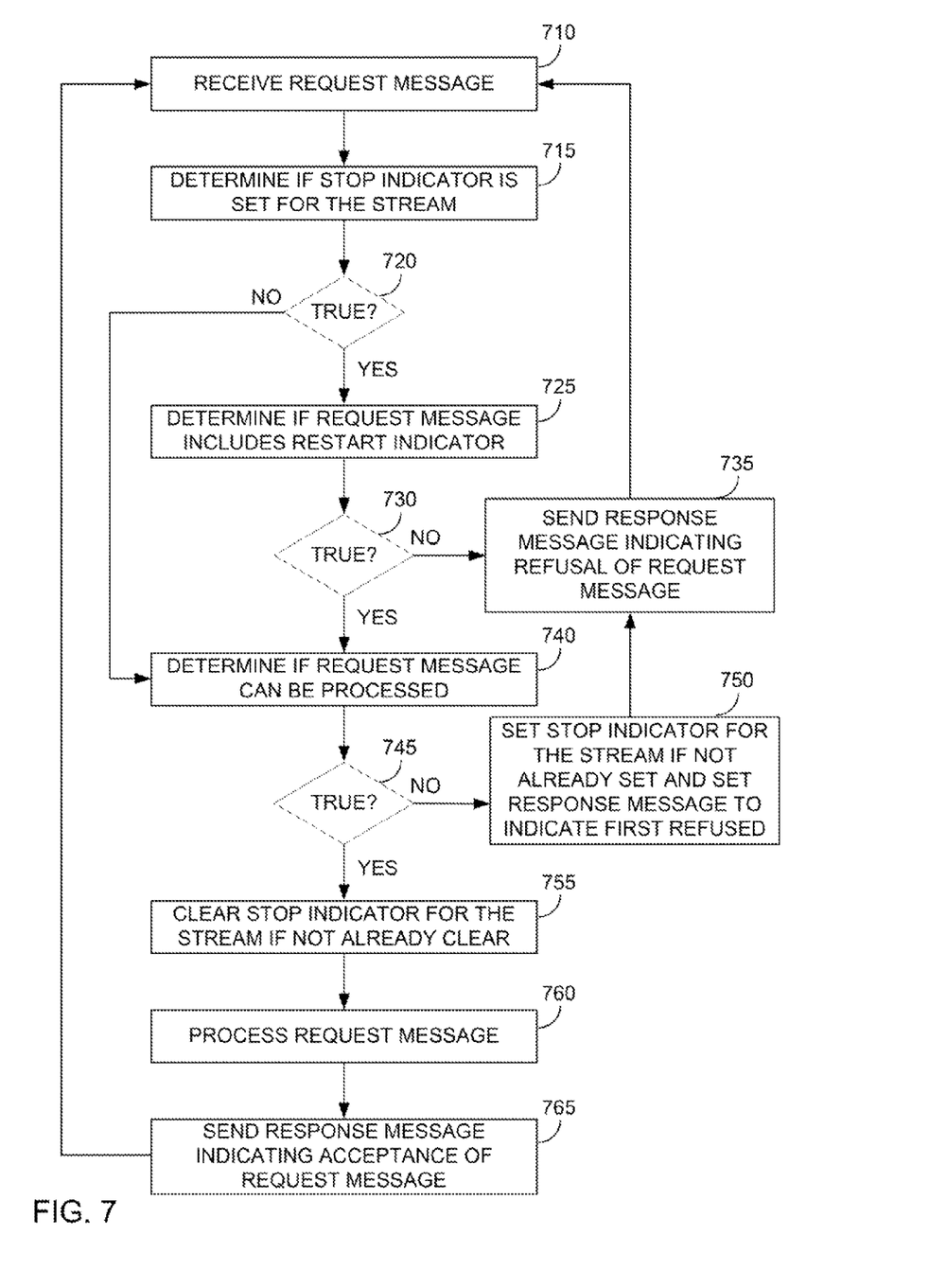
FIG. 7 depicts an example of a high level flow diagram for receiving request messages.

FIG. 7 depicts an example of a high level flow diagram for receiving request messages. In block 710 a destination node receives a new request message from a source node. In block 715 it is determined if the stop indicator for the stream associated with the request message is set. In block 720, if it is determined that the stop indicator is not set, the process moves to block 740, which will be described in further detail below. If at block 720 it is determined that the stop indicator is set for the stream, the process moves to block 725.

In block 725 it is determined if the request message includes a restart indicator. If block 725 is reached, the stop indicator for the stream is currently set. At block 730, if the restart indicator is not included in the request message, the process moves to block 735, wherein a response message indicating a refusal of the request message is sent to the destination node. The request message may be refused because a request message for a stopped stream cannot be accepted without the restart indicator. Accepting a request message for a stopped stream may result in request messages being received out of order, thus a request message for a stopped stream should be refused. The process may move back to block 710, wherein the destination node continues to wait for the next request message.

If it is determined in block 730 that the request message does include the restart indicator, the process moves to block 740. In block 740, it is determined if the request message can be processed. It is possible that the condition that caused the stream to be stopped in the first place still exists, thus the stream should not be restarted, even if the request message includes the restart indicator. For example, if the stream was stopped because a request message descriptor could not be allocated, it is possible that a request message descriptor still cannot be allocated. If the stream has not been previously stopped. It still needs to be determined if the request message that has been received can be processed by the destination node. In some implementations, the stopped indicator is always cleared when entering block 740. The stop indicator may then be set again, if necessary, after execution of block 740. At block 745, if it is determined that the request message cannot be processed, the process moves to block 750, wherein the stop indicator for the stream is set, if it is not already set. In some implementations, the stop indicator may be set in block 750, without regard to the current state of the stop indicator. In either case, the stop indicator may be set for the stream after execution of block 750. In addition, the response message that will be sent in block 735 is set to indicate that the refusal is a first refused response. As mentioned above, a first refused response is used by the source node to determine where to begin sending request messages, A refusal response is sent in block 735, as was described above.

If at block 745 it is determined that the request message can be processed by the destination node, the process may move to block 755. In block 755, the stop indicator for the steam is cleared if it was not already clear. In some implementations, the stop indicator may be cleared in block 755, regardless of the current state. In either case, after execution of block 755, the stop indicator for the stream is cleared. In block 760 the request message is processed. Processing the request message can include adding a new packet descriptor to the outbound descriptor, allocating storage space for the data packet associated with the request message, and any other actions that are needed for eventual transfer of the data packet associated with the request message to be sent from the source node to the destination node. However, for purposes of the present description, processing the request message may mean that the destination node is made aware a data packet is available for delivery and the destination node is willing and able to receive the data packet.

In block 765 a response message indicating acceptance of the request message is sent to the source node. The response message indicates to the source node that the destination node has received the request message and is able to process the request message. The source node may then continue to send request messages, as was described with respect to FIG. 5. The process may return to block 710, wherein the destination node awaits the next request message.

I claim:

1. A method comprising:
receiving a request message at a destination node;
determining if the destination node is able to process the request message;
determining, by the destination node, if a stop indicator is set for a stream associated with the request message;
determining, by the destination node, if the request message includes a restart indicator;
clearing the stop indicator for the stream if the request message includes the restart indicator and the destination node is able to process the request message;
sending a response message indicating refusal of the request message if the stop indicator is set and the request message does not include the restart indicator;
sending the response message indicating refusal of the request message if the stop indicator for the stream is set, the request message includes a restart indicator, and the destination node is unable to process the request message; and
sending the response message indicating acceptance of the request message if the request message includes the restart indicator and the destination node is able to process the request message.

2. The method of claim 1 further comprising:
determining if the destination node is able to process the request message; and
sending the response message indicating acceptance of the request message if the stop indicator is not set and destination node is able to process the request message.

3. The method of claim 1 further comprising:
determining if the destination node is able to process the request message;
setting the stop indicator for the stream if the stop indicator is not set and the destination node is not able to process the request message; and
sending the response message indicating refusal of the request message, wherein the response includes a first refused indicator, if the destination node is not able to process the request message.

4. A method comprising:
sending a plurality of request messages, in order, from a source node;
receiving a response message indicating refusal of one of the plurality of request messages;
setting, at the source node, a restart pending indicator for a stream associated with the response message indicating refusal;
discontinuing sending additional request messages for the stream until the restart pending indicator is cleared;
maintaining a data structure at the source node, the data structure including a count of outstanding request messages, wherein the count is incremented upon sending each request message and decremented upon receiving the response message for each request message, the data structure further including a first refused indicator, wherein the first refused indicator identifies a first refused request message, the first refused indicator set based on the response message; and
clearing the restart bending indicator once the count of outstanding request messages reaches zero.

5. The method of claim 4 further comprising:
resending the plurality of request messages in order, starting from the first refused request message, once the restart pending indicator is cleared.

6. The method of claim 5 wherein a first resent request message includes a restart indicator.

7. A device comprising:
a hardware request module to send request messages, in order, over a designated communications channel, wherein request messages sent over the designated communications channel are received in the same order as sent, for data packets associated with a stream of ordered data packets while a restart pending indicator for the stream is cleared, the hardware request module further to maintain a count of request messages for which no response has been received; and
a hardware response module to receive response messages for each of the request messages and to set the restart pending indicator for the stream if any response message indicates a refusal of the request message, the response hardware module further clears the restart pending indictor when the count of request messages indicates responses for all request messages have been received and the request module sends request messages starting from a first refused request message.

8. The device of claim 7 wherein the request module further includes a restart indicator in a first request message sent after the restart pending indicator is cleared.

9. The device of claim 7 wherein the device is an application specific integrated circuit.

* * * * *

UNITED STATES PATENT AND TRADEMARK OFFICE
CERTIFICATE OF CORRECTION

| | | |
|---|---|---|
| PATENT NO. | : 8,539,113 B2 | Page 1 of 1 |
| APPLICATION NO. | : 13/161894 | |
| DATED | : September 17, 2013 | |
| INVENTOR(S) | : Michael L. Ziegler | |

It is certified that error appears in the above-identified patent and that said Letters Patent is hereby corrected as shown below:

In the Claims:

In column 18, line 16, in Claim 4, delete "bending" and insert -- pending --, therefor.

Signed and Sealed this
Twenty-seventh Day of May, 2014

Michelle K. Lee
*Deputy Director of the United States Patent and Trademark Office*